United States Patent
Malone et al.

(10) Patent No.: US 8,701,477 B2
(45) Date of Patent: *Apr. 22, 2014

(54) METHODS AND SYSTEMS FOR DIAGNOSING A TURBOCHARGER

(75) Inventors: Matthew John Malone, Lawrence Park, PA (US); Kendall Roger Swenson, Lawrence Park, PA (US); Neil Blythe, Lawrence Park, PA (US); Milan Karunaratne, Lawrence Park, PA (US); Bret Dwayne Worden, Erie, PA (US); Paul Lloyd Flynn, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 13/234,517

(22) Filed: Sep. 16, 2011

(65) Prior Publication Data

US 2013/0067914 A1    Mar. 21, 2013

(51) Int. Cl.
    *G01M 15/00*    (2006.01)
(52) U.S. Cl.
    USPC ........................................ 73/114.77; 73/49.7
(58) Field of Classification Search
    USPC .............. 73/40, 46, 47, 49.7, 112.01, 112.03, 73/114.77
    See application file for complete search history.

(56) References Cited

U.S. PATENT DOCUMENTS

| | | | |
|---|---|---|---|
| 4,490,622 A | 12/1984 | Osborn | |
| 5,585,553 A * | 12/1996 | Schricker | 73/114.37 |
| 6,298,718 B1 * | 10/2001 | Wang | 73/114.01 |
| 6,368,077 B1 | 4/2002 | Meyerkord et al. | |
| 6,745,568 B1 * | 6/2004 | Squires | 60/605.3 |
| 6,966,746 B2 | 11/2005 | Cardenas et al. | |
| 7,469,539 B2 * | 12/2008 | Squires | 60/605.3 |
| 8,474,433 B2 * | 7/2013 | French | 123/320 |
| 2001/0032465 A1 * | 10/2001 | Terry et al. | 60/602 |
| 2004/0048131 A1 | 3/2004 | Canepa et al. | |
| 2008/0034753 A1 * | 2/2008 | Furman et al. | 60/605.1 |
| 2008/0223036 A1 | 9/2008 | Hara et al. | |
| 2009/0290971 A1 | 11/2009 | Shamseldin et al. | |
| 2010/0143114 A1 * | 6/2010 | Purdey | 415/230 |
| 2012/0279290 A1 * | 11/2012 | Malone | 73/114.16 |

FOREIGN PATENT DOCUMENTS

| | | |
|---|---|---|
| FR | 2827336 A1 | 1/2003 |
| WO | 2008035018 A2 | 3/2008 |
| WO | WO2009145745 | 12/2009 |

OTHER PUBLICATIONS

Pfau et al, "Virtual Four Sensor Fast Response Aerodynamic Probe (FRAP)", The 16th Symposium of Measuring Techniques in Transonic and Supersonic Flow in Cascades and Turbomachines, pp. 1-8, Cambridge, UK, Sep. 2002.

Schlienger et al, "Measuring Unsteady 3D Flow With a Single Pressure Transducer", pp. 1-10, Laboratory for Turbomachinery, ETH Zurich, Switzerland, undated.

(Continued)

*Primary Examiner* — Eric S McCall
(74) *Attorney, Agent, or Firm* — GE Global Patent Operation; John A. Kramer

(57) ABSTRACT

Various methods and systems are provided for a turbocharger. In one example, a method includes determining a first pressure at a first location within a turbocharger and determining a second pressure at a second location within the turbocharger. The method further includes indicating degradation of the turbocharger based on the first pressure and the second pressure.

21 Claims, 6 Drawing Sheets

(56) References Cited

OTHER PUBLICATIONS

Pfau et al, "Unsteady Flow Interactions Within the Inlet Cavity of a Turbine Rotor Tip Labyrinth Seal", Journal of Turbomachinery, vol. 127, pp. 679-688, Oct. 2005.

Schuck, et al, "Influence of Structural Parameters and Flow Conditions on the Dynamic Behaviour of Flexible Labyrinth Seals", Darmstadt University of Technology, Dpt. of Mechatronics and Machine Acoustics, Darmstadt, Germany, p. 1, undated.

Eldin, "Leakage and Rotordynarnic Effects of Pocket Damper Seals and See-Through Labyrinth Seals", Dissertation submitted to Texas A&M University, pp. i-xvi, and pp. 1-205, Dec. 2007.

Malone, U.S. Appl. No. 13/102,700, entitled "Apparatus System and Method for Testing a Turbocharger", pp. 1-24, filed May 6, 2011.

Search Report and Written Opinion from corresponding PCT Application No. PCT/US2012/053501 dated Dec. 6, 2012.

* cited by examiner

METHODS AND SYSTEMS FOR DIAGNOSING A TURBOCHARGER

FIELD

Embodiments of the subject matter herein relate to internal combustion engine systems. Other embodiments relate to turbochargers.

BACKGROUND

Turbochargers may be used in an engine system to increase a pressure of air supplied to the engine for combustion. In one example, the turbocharger includes a turbine coupled in an exhaust passage of the engine which at least partially drives a compressor via a shaft to increase the intake air pressure. High pressure air from the turbine or the compressor may leak past non-contact labyrinth seals into an oil cavity surrounding the shaft of the turbocharger. Because the low pressure oil cavity is in fluid communication with a crankcase of the engine, crankcase pressure may increase due to the leakage of the high pressure air, leading to crankcase over pressure events and eventual removal of the turbocharger from the engine system, for servicing or replacement.

In other examples, crankcase over pressure events may occur due to other factors, such as degradation of piston rings, which increases blow-by around the piston, and/or degradation of an evacuation system which maintains a pressure of the crankcase. In such examples, however, the turbocharger may still be removed from the engine system even though it is not the cause of the crankcase over pressure event, if the exact cause of the crankcase overpressure event is unknown.

BRIEF DESCRIPTION

In one embodiment, a method includes determining a first pressure at a first location within a turbocharger and determining a second pressure at a second location within the turbocharger. The method further includes indicating degradation of the turbocharger based on the first pressure and the second pressure. For example, a control signal may be output responsive to determining (based on the first and second pressures) that the turbocharger has degraded to a point requiring servicing, for initiating an alert or alarm, controlling a vehicle or other system, etc.

From this indication, for example, it is possible to identify whether or not crankcase overpressure is due to turbocharger shaft seal degradation, or to some other source. Further, the method is carried out while the turbocharger is in operation, as a pressure difference between two locations within the turbocharger is measured. As such, degradation of the turbocharger may be detected without having to remove the turbocharger from an engine system to which it is coupled, and the turbocharger may be removed only if degradation is indicated.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for diagnosing a turbocharger. One exemplary method includes determining a first pressure at a first location within a turbocharger and determining a second pressure at a second location within the turbocharger. The method further includes indicating degradation of the turbocharger based on the first pressure and the second pressure, for example, when a difference between the first pressure and the second pressure is greater than a threshold difference. In this way, degradation of a component of the turbocharger, such as a non-contact seal, may be diagnosed, as a clearance around the seal increases with seal degradation leading to pressure changes within the turbocharger. In some examples, the method may further include determining frequency content of the second pressure. For example, the second pressure may be a seal cavity pressure. By determining frequency content of the seal cavity pressure, degradation of a component of the turbocharger, such as a fan blade of the compressor or turbine, may be diagnosed. Thus, by measuring pressure at various locations within the turbocharger, it may be determined that engine crankcase overpressure is due to turbocharger degradation. Furthermore, based on whether degradation is diagnosed by a pressure difference greater than a threshold difference or frequency content, a location of degradation in the turbocharger may be determined.

In one embodiment, the turbocharger may be coupled to an engine in a vehicle. A locomotive system is used to exemplify one of the types of vehicles having engines to which a turbocharger, or multi-turbocharger, may be attached. Other types of vehicles may include on-highway vehicles, and other off-highway vehicles such as mining equipment and marine vessels. Other embodiments of the invention may be used for turbochargers that are coupled to stationary engines. The engine may be a diesel engine, or may combust another fuel or combination of fuels. Such alternative fuels may include gasoline, kerosene, biodiesel, natural gas, and ethanol. Suitable engines may use compression ignition and/or spark ignition.

Figure 1:
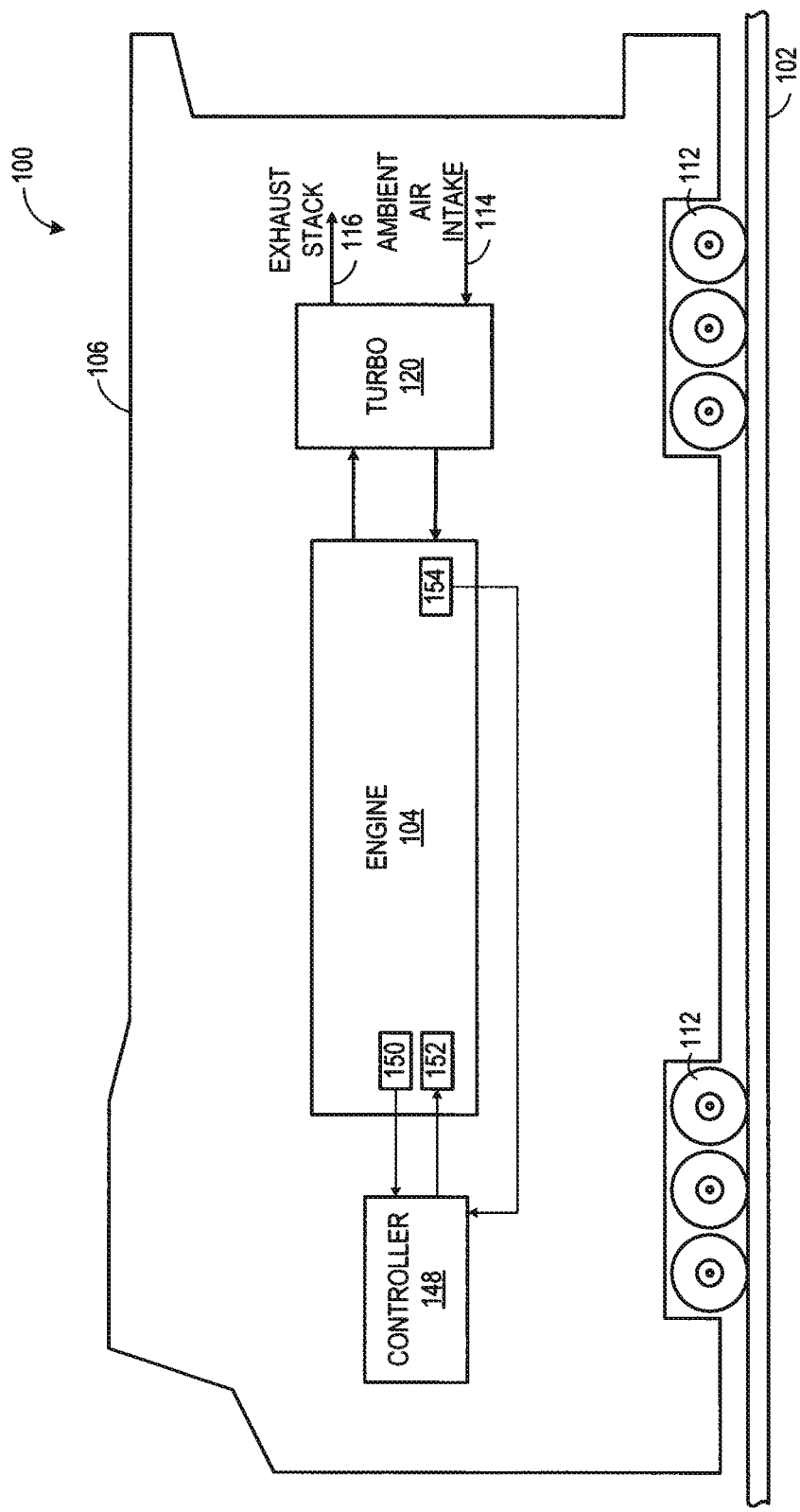
FIG. 1 shows a schematic diagram of a vehicle with a turbocharger.

FIG. 1 shows a block diagram of an exemplary embodiment of a vehicle system 100, herein depicted as a rail vehicle 106 (e.g., locomotive), configured to run on a rail 102 via a plurality of wheels 112. As depicted, the rail vehicle 106 includes an engine system with an engine 104, such as an internal combustion engine.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106.

The engine system includes a turbocharger 120 ("TURBO") that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown in FIG. 1) which is at least partially driven by a turbine (not shown in FIG. 1). While in this case a single turbocharger is shown, the system may include multiple turbine and/or compressor stages. The turbocharger is described in greater detail below with reference to FIG. 2.

In some embodiments, the vehicle system 100 may further include an exhaust gas treatment system coupled in the exhaust passage upstream or downstream of the turbocharger 120. In one exemplary embodiment, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NO trap, or various other devices or systems.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, intake manifold air pressure (MAP) 154, etc. Correspondingly, the controller 148 may control the vehicle system 100 by sending commands to various components such as traction motors, alternator, cylinder valves, throttle, etc. In one example, the controller 148 may shut down the engine in response to an engine crankcase pressure greater than a threshold pressure.

In one embodiment, as described below with reference to FIG. 3, the controller 148 may be configured to receive signals indicating pressure from a plurality of pressure sensors positioned in various locations within the turbocharger, e.g., first and second different locations. As an example, a first pressure sensor which outputs a first pressure signal may be positioned in a seal cavity of the turbocharger and a second pressure sensor which outputs a second pressure signal may be positioned in an oil cavity of the turbocharger. The controller may identify degradation of the turbocharger responsive to a difference between the first pressure and the second pressure greater than a threshold difference.

Figure 2:
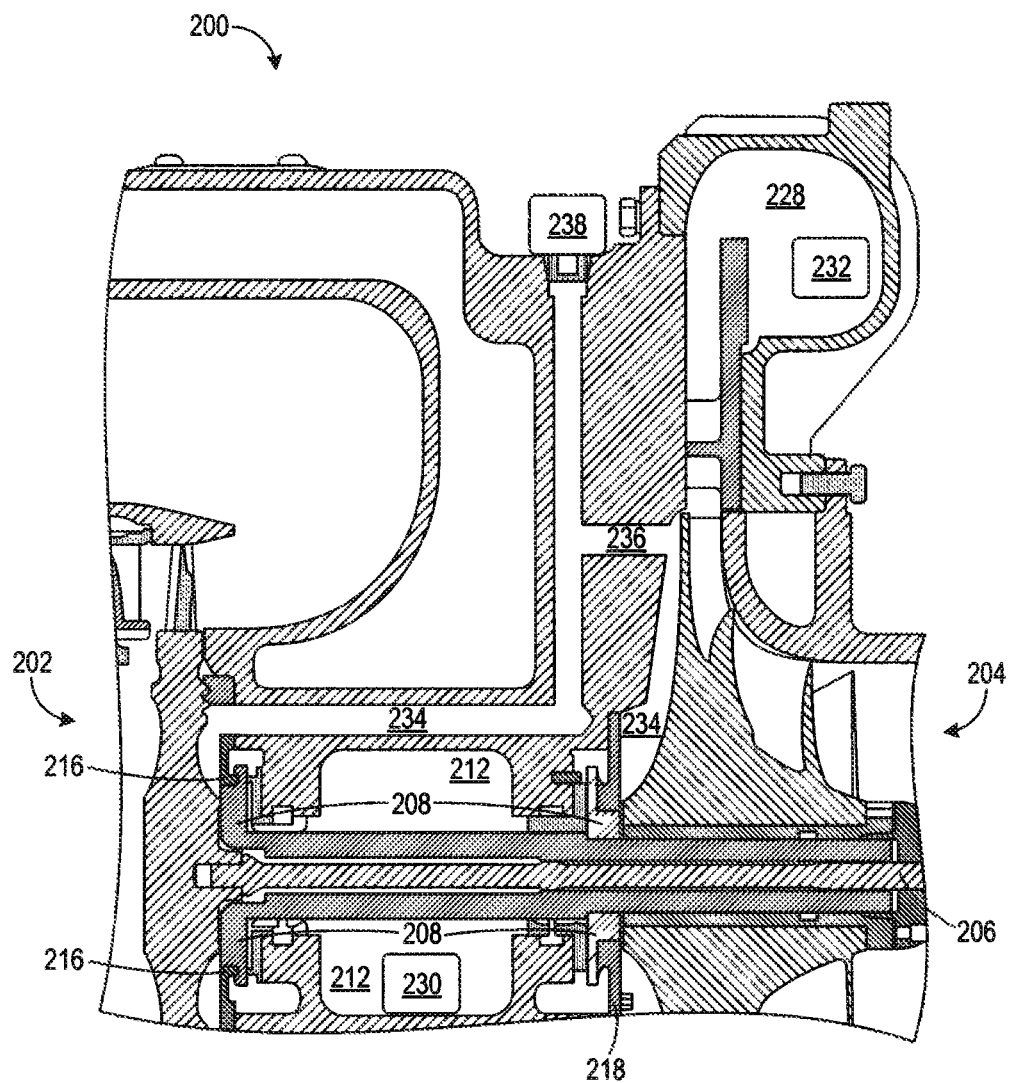
FIG. 2 shows a cross-sectional view of a portion of a turbocharger.

FIG. 2 shows a view of an exemplary embodiment of a turbocharger 200 that may be coupled to an engine, such as turbocharger 120 described above with reference to FIG. 1. The view shown in FIG. 2 is a cross-sectional view of a portion of the turbocharger 200. In one example, turbocharger 200 may be bolted to the engine. In another example, the turbocharger 200 may be coupled between the exhaust passage and the intake passage of the engine. In other examples, the turbocharger may be coupled to the engine by another suitable manner.

The turbocharger 200 includes a turbine 202 and a compressor 204. Exhaust gases from the engine pass through the turbine 202, and energy from the exhaust gases is converted into rotational kinetic energy to rotate a shaft 206 which, in turn, drives the compressor 204. Ambient intake air is compressed (e.g., pressure of the air is increased) as it is drawn through the rotating compressor 204 such that a greater mass of air may be delivered to the cylinders of the engine.

In some embodiments, the turbine 202 and the compressor 204 may have separate casings which are bolted together, for example, such that a single unit (e.g., turbocharger 200) is formed. As an example, the turbine may have a casing made of cast iron and the compressor may have a casing made of an aluminum alloy. In other examples, casings of the turbine and the compressor may be made of the same material. It should be understood the turbine casing and the compressor casing may be made of any suitable materials.

As depicted in FIG. 2, a first pressure sensor 232 is positioned at a diffuser 228 in the compressor casing to measure a pressure in the compressor casing. The diffuser 228 is a divergent duct in the compressor casing which converts velocity energy to pressure energy, for example. The pressure sensor 232 may be a transducer, for example, which generates a signal as a function of the pressure imposed. The pressure at the diffuser 228 may be substantially equal to the intake manifold air pressure (MAP). For example, at notch eight of some engine systems, the first pressure sensor 232 may measure a pressure of approximately 45 psig (~3 bar).

The turbocharger 200 further includes bearings 208 to support the shaft 206, such that the shaft may rotate at a high speed with reduced friction. The turbocharger may further include a lubrication system to reduce degradation of the bearings and to maintain a temperature of the bearings (e.g., to keep the bearings cool). While the engine is in operation, a constant flow of engine oil or engine coolant may pass through the turbocharger, for example. In one example, pressurized engine oil may enter the turbocharger via an oil inlet (not shown). Excess oil may collect in an oil cavity 212, and the oil leaves the turbocharger 200 through an outlet (not shown) fluidly coupled with the oil cavity 212. As depicted in FIG. 2, an oil cavity pressure sensor 230 is positioned in the oil cavity 212 to measure a pressure in the oil cavity. The oil cavity pressure sensor 230 may be in addition to the first pressure sensor 232, or it may be alternative thereto. The oil cavity pressure sensor 230 may be a transducer, for example, which generates a signal as a function of the pressure imposed.

As depicted in FIG. 2, the turbocharger 200 further includes two non-contact seals (e.g., labyrinth seals), a turbine labyrinth seal 216 positioned between the oil cavity 212 and the turbine 202 and a compressor labyrinth seal 218 positioned between the oil cavity 212 and the compressor 204. A labyrinth seal as used herein refers to a type of mechanical seal that provides a tortuous or serpentine path to help prevent leakage. (As opposed to, for example, an O-ring or similar circular seal.) In one embodiment, the labyrinth seal may be composed of many grooves or threads that press tightly against another component. Herein, the labyrinth seal is applied to a rotating shaft system, with a small clearance between tips of the labyrinth threads and the running surface. In this way, the labyrinth seal provides non-contact sealing action by controlling the passage of fluid. The labyrinth seals 216 and 218 may thus reduce leakage of the engine oil used to lubricate the bearings 208 to the turbine 202 and the compressor 204, for example, by providing a contorted, tortuous path. Because the labyrinth seals 216 and 218 are non-contact seals, friction around the bearings 208 and the shaft 206 may be reduced, while oil leakage is also reduced. In one example, the labyrinth seals 216 and 218 may be spaced a determined distance from the bearings 208. Suitable determined distances may be determined with reference to application specific parameters, such as in a range of less than ~1/4000 of an inch (~$6 \times 10^{-4}$ cm).

The turbocharger 200 further includes a seal cavity 234 that extends from behind the compressor 204 near the compressor labyrinth seal 218 to an area near the turbine labyrinth seal 216. The seal cavity 234 is an air passage in the casing of the turbocharger 200. As shown in FIG. 2, the seal cavity 234 includes an orifice 236. The orifice is configured to generate a choked air flow. In such a configuration, the choked airflow may generate a greater pressure difference further downstream resulting in better detection of differences in pressure between various locations in the turbocharger 200. The seal cavity 234 further includes a second pressure sensor 238 to measure a pressure in the seal cavity 234. As depicted in FIG. 2, the second pressure sensor 238 is located at a port of the seal cavity 234. The second pressure sensor 238 may be a transducer, for example, which generates a signal as a function of the pressure imposed. The pressure in the seal cavity 234 may be higher than the pressure in the oil cavity 212, for example, such that oil may be retained in the oil cavity. As an example, at notch eight of certain engine systems, the pressure sensor 238 may measure a pressure of approximately 27 psig (~2 bar).

Each pressure sensor location may have a different pressure. For example, the pressure at the diffuser 228 in the compressor casing may be higher than the pressure in the seal cavity 234, and the pressure in the seal cavity 234 may be higher than the pressure in the oil cavity 212. Further, the differences between each pressure may change with operating conditions such as turbine or compressor speed, notch setting of the engine, ambient temperature and/or pressure, and the like. When degradation of the turbine labyrinth seal 216 and/or the compressor labyrinth seal 218 occurs due to the shaft 206 rubbing the seals because of rotor imbalance or axial shifts, pressure in the seal cavity 234 may decrease, while the pressure at the diffuser 228 in the compressor casing remains substantially the same. As such, degradation of the labyrinth seals 216 and 218 may be diagnosed based on a pressure difference between a pressure measured in the seal cavity 234 and a pressure measured at the diffuser 228 in the compressor casing greater than respective threshold differences.

In one embodiment, a system comprises a turbocharger with a compressor and a turbine, a first pressure sensor which generates a first signal, and a second pressure sensor which generates a second signal. The first pressure sensor is disposed in an oil cavity of the turbocharger, and the second pressure sensor disposed in a seal cavity of the turbocharger. The system further comprises a controller configured to identify a first pressure from the first signal and a second pressure from the second signal and to identify degradation of the turbocharger if a difference between the first pressure and the second pressure is greater than a first threshold difference. In embodiments, identifying degradation of the turbocharger includes outputting a control signal, e.g., for initiating an alarm or alert or controlling a vehicle system.

In some embodiments, an upgrade kit that may be installed in a rail vehicle or other vehicle may include a non-transient computer readable medium including instructions for determining degradation of a turbocharger based on pressure values measured within the turbocharger, as described above. The upgrade kit may further include a plurality of pressure sensors or other mechanical elements that may be installed in the turbocharger system.

Figure 3:
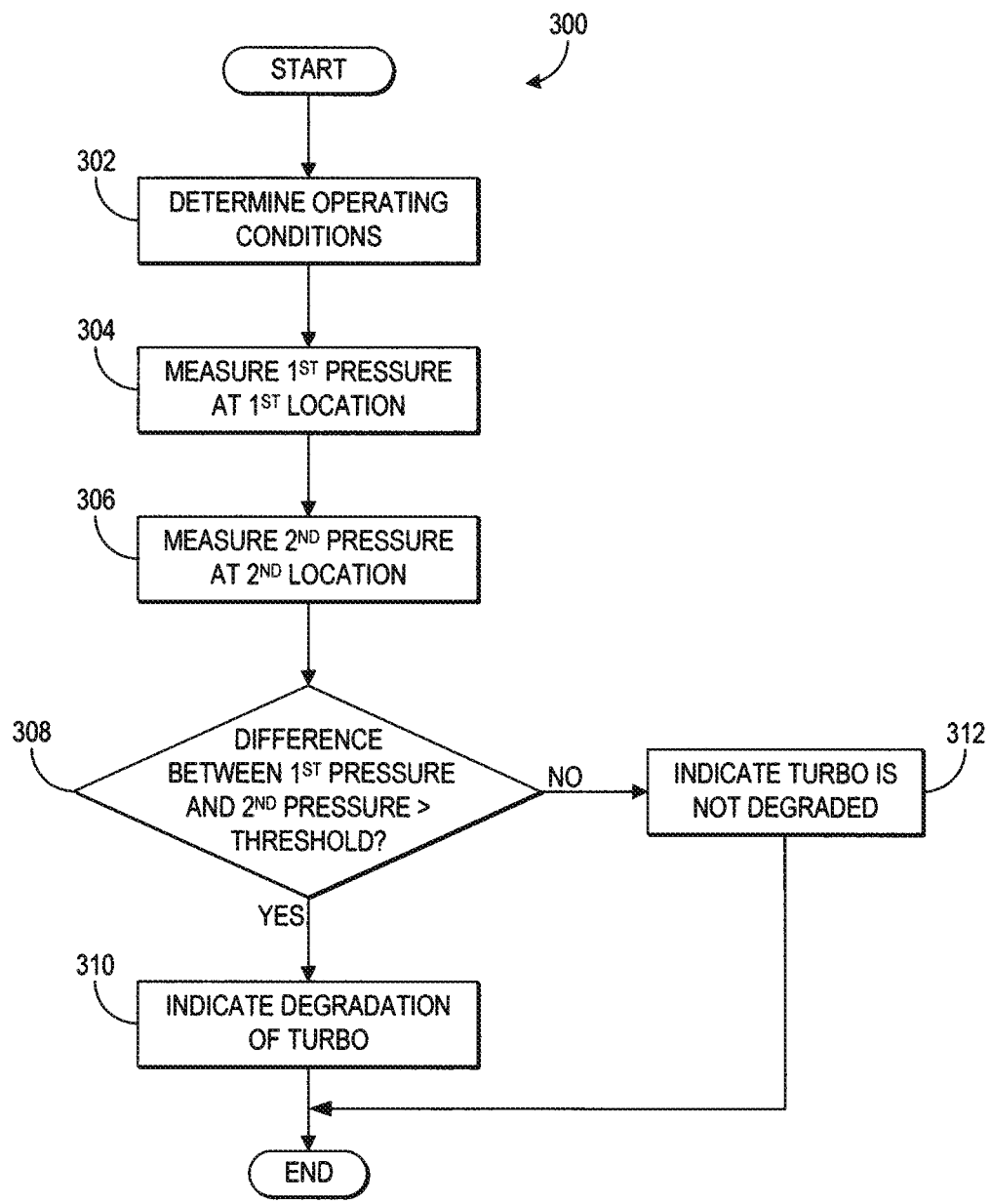
FIG. 3 shows a flow chart illustrating a method for diagnosing a turbocharger based on pressure measurements.
Figure 4:
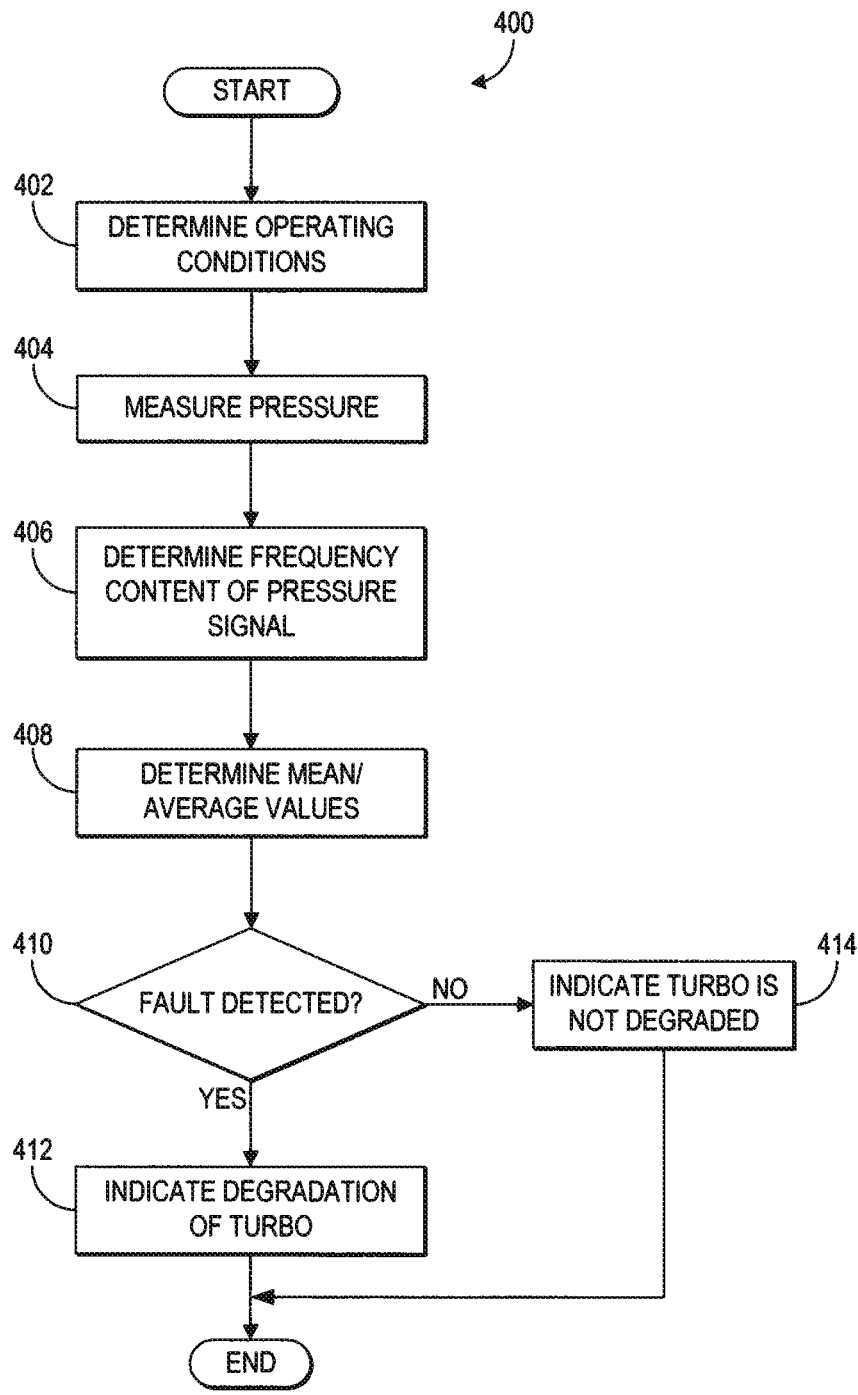
FIG. 4 shows a flow chart illustrating a method for diagnosing a turbocharger using frequency content of a pressure signal.
Figure 6:
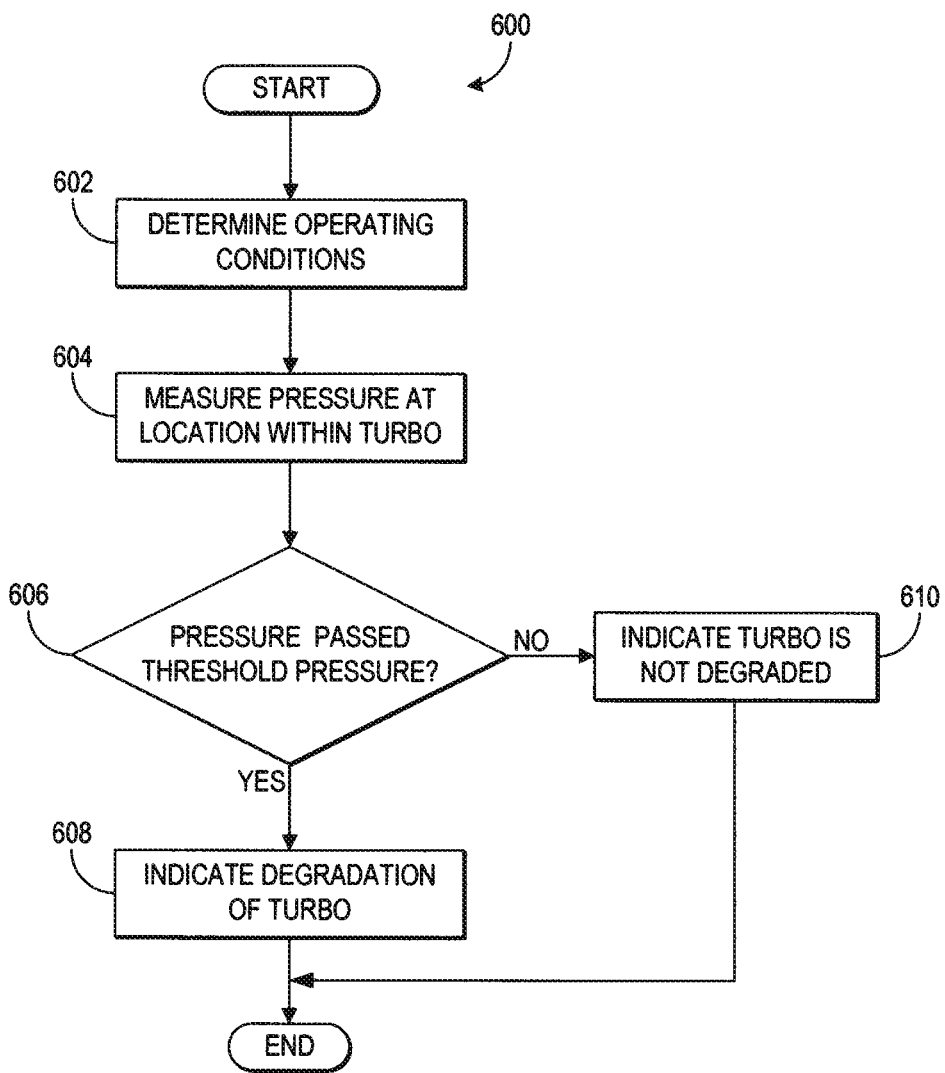
FIG. 6 shows a flow chart illustrating a method for diagnosing a turbocharger based on a pressure measurement.

FIGS. 3, 4, and 6 show flow charts illustrating exemplary methods which may be carried out in a vehicle system which includes a turbocharger coupled to an engine. FIG. 3 shows a method for diagnosing degradation of non-contact seals disposed around the turbocharger shaft based on measured pressure differences within the turbocharger. FIG. 4 shows a method for diagnosing degradation of the turbine or compressor of the turbocharger based on frequency content of a measured pressure within the turbocharger. FIG. 6 shows a method for diagnosing degradation of non-contact seals disposed around the turbocharger shaft based on measured pressures within the turbocharger. The methods described with reference to FIGS. 3, 4, and 6 may be carried out by the same controller and at the same time, for example. As an example, a second pressure may be measured to compare with a first pressure, frequency content of the second pressure may also be determined, and the first and/or second pressures may be compared to respective threshold pressures. Further, the methods described with reference to FIGS. 3, 4, and 6 are carried out while an engine to which the turbocharger is coupled is operating (e.g., while combustion is occurring), and may be carried out while a vehicle in which the turbocharger is positioned is travelling.

In one exemplary embodiment, a method comprises determining a first pressure at a first location in a turbocharger, determining a second pressure at a second location in a turbocharger, and determining frequency content of the second pressure. The method further comprises diagnosing a condition of the turbocharger based on a difference between the first pressure and the second pressure and the frequency content of the second pressure.

Turning to FIG. 3, a method 300 for diagnosing a condition in a turbocharger, such as the turbocharger 200 described above with reference to FIG. 2, is shown. Specifically, the method includes measuring pressure via pressure sensors positioned at various locations within the turbocharger and comparing the measured pressure values. For example, a first pressure measured at a first location is compared to a second pressure measured at a second location. Degradation of the turbocharger is determined based on the difference in the measured pressure values. As described above, the method is carried out while an engine to which the turbocharger is coupled is in operation, and may be carried out while a vehicle, such as a rail vehicle, in which the turbocharger is positioned is travelling. In this manner, pressure differences between the various cavities of the turbocharger may be great enough to measure.

At step 302, system operating conditions are determined. The operating conditions may include boost pressure, ambient pressure, ambient temperature, engine notch setting, and the like.

Once the operating conditions are determined, the method proceeds to step 304 where a first pressure is measured at a first location. As described above, the turbocharger may have a plurality of pressure sensors positioned at various locations within the turbocharger. As such, the first pressure may be measured by a first pressure sensor located in the oil cavity, a pressure sensor located at the diffuser in the compressor casing, or a pressure sensor located in the seal cavity. In other embodiments, the first pressure may be measured at another suitable location within the turbocharger.

At step 306, a second pressure is measured at a second location. The second location may be a location other than the first location. For example, the first pressure may be measured by the first pressure sensor in the oil cavity and the second pressure may be measured by the second pressure sensor in the seal cavity. As another example, the first pressure may be measured by the first pressure sensor at the diffuser in the compressor casing and the second pressure may be measured by the second pressure sensor in the seal cavity. In other embodiments, the second pressure may be measured at another suitable location within the turbocharger.

Once the first pressure and the second pressure are determined, it is determined if a difference between the first pressure and the second pressure is greater than a threshold difference at step 308. The particular threshold difference against which the first and second pressures are assessed may depend on the locations in the turbocharger where the first and second pressures are sensed, with different sets of locations having different threshold differences. For example, the threshold difference between the pressure in the seal cavity and the pressure in the oil cavity (if the first and second pressures are measured at these locations) may be a first threshold difference, and the threshold difference between the pressure in the seal cavity and the pressure at the diffuser in the compressor casing (if the first and second pressures are measured at these locations) may be a second threshold difference. The first threshold difference may have a different value than the second threshold difference, as each of the measured pressures may have different values under normal operating conditions. As an example, under normal operating conditions in which the turbocharger is healthy (e.g., not degraded), the first pressure in the oil cavity may have a particular value and the second pressure measured in the seal cavity may have a higher value such that the oil cavity retains oil. Further, the pressure measured in the seal cavity may vary with operating conditions such as engine notch, engine speed, ambient temperature, ambient pressure, engine oil temperature, engine coolant temperature, fuel injection advance angle, charge air pressure, turbocharger speed, and/or charge air temperature. For example, the seal cavity may have a higher pressure at a higher engine notch (e.g., at notch eight as compared to notch four). Likewise, the threshold difference may change based on operating conditions such as compressor speed, engine load, engine notch, and the like. For example, as the speed of the compressor decreases, the seal cavity pressure may also decrease resulting in a decreased pressure difference between the seal cavity and the oil cavity. As such, a threshold difference between the seal cavity and the oil cavity, for assessing pressures at these locations in regards to possible turbocharger degradation, may decrease correspondingly such that degradation of the turbocharger is not falsely identified.

As another example, under normal operating conditions in which the turbocharger is healthy, the first pressure at the diffuser in the compressor casing may have a value similar to the manifold air pressure and the second pressure measured in the seal cavity may have a lower value. The pressures measured at the diffuser in the compressor casing and in the seal cavity may vary with operating conditions, such as engine notch setting and turbocharger speed. For example, the pressure measured at the diffuser in the seal cavity may increase with engine notch (e.g., the pressure is higher at notch seven than at notch six).

The difference between the first pressure and the second pressure under various operating conditions may be stored in a look-up table, for example. When the absolute value of the pressure difference between the first and second pressure crosses a threshold value, degradation of the turbocharger is indicated at step 310. In one example, when the difference between the first pressure and the second pressure is greater than a threshold value, degradation of a non-contact seal, such as the turbine or compressor labyrinth seals, may be diagnosed. (For effecting a diagnosis of this type, sensors could be placed at various locations within the turbocharger, such as the oil cavity, seal cavity, at the diffuser in the compressor casing, or the like.) For example, due to rotor imbalance or axial shifts, the rotating shaft of the turbocharger may rub on the non-contact labyrinth seals, thereby generating a clearance around the non-contact labyrinth seals and increasing airflow to the crankcase leading to crankcase overpressure and a decrease in seal cavity pressure. Thus, as the seal cavity pressure decreases, the difference between the seal cavity pressure and the oil cavity pressure changes and the difference between the seal cavity pressure and pressure at the diffuser in the compressor casing changes.

For a look-up table, the look-up table would include a list of designated operating conditions (of a class, type, or configuration of engines, vehicles, or other systems), and for each operating condition, an associated threshold value for a pressure difference, determined empirically for example. In operation, the current operating mode (of the engine or vehicle or other system in question) would be cross-referenced to the corresponding operating condition of the table, for retrieving the associated threshold value. The pressure difference (difference between first and second sensed pressures in a turbocharger) would then be compared to the retrieved threshold value, for assessing turbocharger health.

The controller may be configured to notify an operator of the vehicle (or other system) in which the engine is positioned of the diagnosis, for example, by sending a diagnostic code to light a malfunction indicator lamp (MIL) which is displayed via an operator interface panel, sending a diagnostic code to a central dispatch control center, or the like. In response receiving the diagnostic signal, turbocharger operation may be suspended, for example, such that further degradation of the engine system and/or turbocharger system does not occur. Once the engine is shut down, the turbocharger may be removed from the vehicle and repaired or replaced. In other examples, engine operation and/or turbocharger operation may be adjusted to compensate for the degraded turbocharger until the engine is shut down. In still other examples, the engine may be shut down upon receiving the diagnostic code indicating degradation of the turbocharger has occurred, such that further degradation of the turbocharger system and/or engine system may be reduced.

On the other hand, if the difference between the first pressure and the second pressure is less than the threshold difference, the method moves to step 312 where it is indicated that the turbocharger is not degraded (or, in embodiments, no action is taken).

In this manner, a degraded condition of the turbocharger may be diagnosed while the turbocharger is in operation. For example, degradation of the turbocharger due to leaks in one or more non-contact seals such as the compressor and turbine labyrinth seals may be identified due to a pressure difference between the first and second pressure that is greater than a threshold difference. When the difference is not greater than the threshold difference, it may be indicated that an engine crankcase over pressure event may be due to a condition other than a degraded turbocharger, such as degraded piston rings or some other source.

FIG. 4 is a flow chart illustrating a method 400 for diagnosing a condition of a turbocharger, such as the turbocharger 200 described above with reference to FIG. 2, based on frequency content of a pressure signal. Specifically, the method includes determining frequency content from a pressure measured at a location within the turbocharger. Based on the frequency content, degradation of the turbine or compressor is identified. As described above, the method is carried out while an engine to which the turbocharger is coupled, and may be carried out while a vehicle, such as a rail vehicle, in which the turbocharger is positioned is travelling. For example, because the frequency content which is determined via the method is based on rotation of the turbine fan or compressor fan, the turbocharger is supplying boost to the engine during engine operation.

At step 402, system operating conditions are determined. The operating conditions may include boost pressure, speed of the turbine and/or compressor of the turbocharger, ambient pressure, ambient temperature, and the like.

At step 404, pressure is measured at a location within the turbocharger. As described above, pressure sensors may be disposed in a plurality of locations within the turbocharger, and as such, pressure may be measured in a seal cavity, in an oil cavity, at a diffuser in the compressor casing, and/or at another suitable location within the turbocharger.

Once the pressure (or pressures) is measured, frequency content of the pressure signal is determined at step 406. For example, because the degradation of the turbine or compressor blades may be most obvious in the seal cavity pressure, frequency content of the pressure measured in the seal cavity may be determined. The frequency content of the pressure is the relative magnitudes of frequency components of a frequency domain pressure signal and/or is a measured frequency content as created with a band-pass filter. In one example, the frequency content may be determined by filtering the signal, sampling the signal, transforming the signal, and applying a correlation algorithm to the signal.

In one exemplary embodiment, the pressure signal may be filtered by a low-pass filter with a cut-off frequency slightly greater than a first-order frequency. For example, the cut-off frequency may be ten to twenty percent greater than the first-order frequency. As such, the cut-off frequency may be determined by a speed of the turbine or compressor. The first-order frequency component may be attributed to spinning of the turbine or compressor fan. For example, in one revolution of the compressor fan, eight fan blades may pass a particular point. Thus, the spinning of the compressor fan may cause a pressure wave inside the crankcase at a frequency corresponding to the number of fan blades and the fan revolution frequency.

Further, the pressure may be sampled at a frequency greater than or equal to a Nyquist rate. In one embodiment, the pressure signal may be sampled at a frequency greater than twice the first turbine or compressor order frequency. In one embodiment, the pressure signal may be sampled at a frequency greater than twice the maximum turbine or compressor frequency. Thus, by low-pass filtering and sampling at a frequency greater than or equal to the Nyquist rate, the frequency content of the pressure may not be aliased. Once the pressure is sampled, the pressure may be transformed. For example, the sampled pressure may be transformed to generate a frequency domain pressure signal. In one example, a fast Fourier transform may be used to generate the frequency domain pressure signal. Next, a correlation algorithm may be applied. In one example, a correlation algorithm may be applied to compare the frequency domain pressure signal, e.g., the frequency content of the pressure, to a signature for a condition of the turbocharger. For example, the signature for a healthy turbocharger may include frequency content at the first-order frequency.

At step 408, mean/average values of the frequency are determined. The average value may be used with the frequency content to diagnose turbocharger degradation. For example, the presence of a pressure pulse above a specified threshold in both average value and frequency content measured in the oil cavity may indicate bearing and non-contact seal failure, which may result in charged air flowing to the engine crankcase, leading to a crankcase overpressure event.

Once the frequency content is determined, it is determined if a fault is detected, at step 410. As an example, the pressure may also include frequency content at other harmonics of the first-order frequency, such as at a second-order frequency (twice the frequency), a third-order frequency (three times the frequency), etc. Similarly, the crankcase pressure may include frequency content at frequencies less than the first-order frequency, such as at a half-order frequency (half the frequency). A fault may be indicated by a harmonic of the first-order frequency, for example, a half-order frequency greater than a threshold value may indicate a broken fan blade. Thus, if a fault is detected, the method continues to step 412 where degradation of the turbocharger is indicated. As described above, when degradation is identified, the controller may send a diagnostic code to light a malfunction indicator lamp (MIL) which is displayed via an operator interface panel, send a diagnostic code to a central dispatch control center, or the like.

On the other hand, if a fault is not detected at step 408, the method moves to step 412 and it is indicated that the turbocharger is not degraded (or, in other embodiments, no action is taken).

Figure 5:
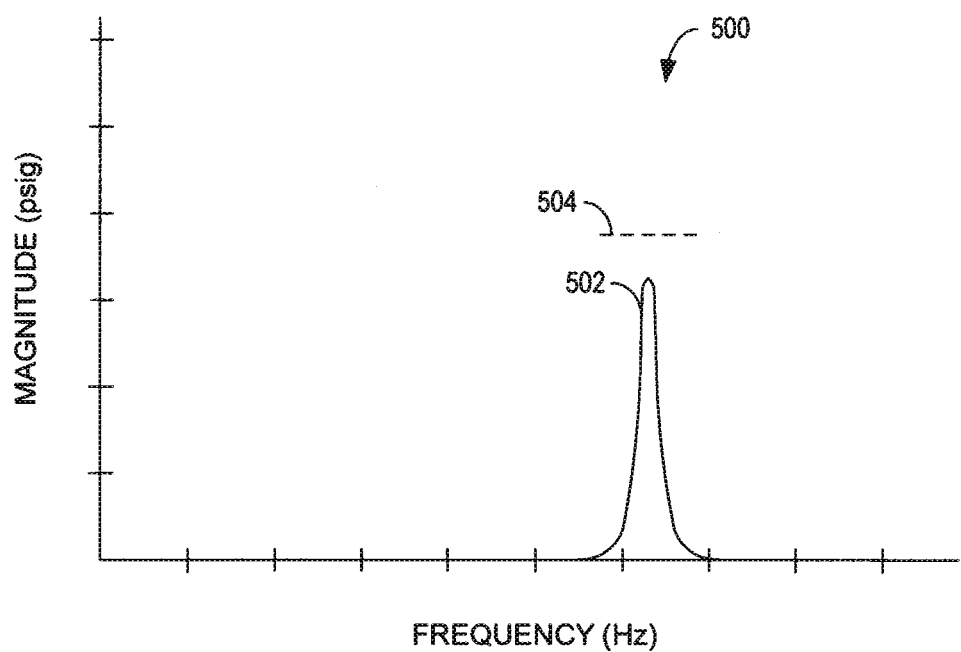
FIG. 5 is a graph showing frequency content of a pressure signal.

FIG. 5 shows a graph 500 showing example frequency content of a pressure signal. The first-order frequency is shown at 502 below a threshold value 504. As described above, the first-order frequency component may be attributed to rotation of the turbine or compressor fan. If the first order frequency is below the threshold value 504, this may indicate a balanced, or healthy, turbine or compressor fan. If the turbine or compressor is imbalanced, due to a fan blade breaking for example, a magnitude of the first order frequency may increase such that it is higher than the threshold 504. The threshold value 504 may change based on various operating conditions, such as fan speed, engine load, engine notch setting, ambient temperature, ambient pressure, engine oil temperature, engine coolant temperature, fuel injection advance angle, charge air pressure, turbocharger speed, charge air temperature, and the like. For example, a higher fan speed (e.g., faster rotation of the fan) may have a first-order frequency with a greater magnitude. As such, the threshold value 504 may increase with fan speed. In this manner, degradation of the compressor or turbocharger fan may be identified.

Thus, frequency content of the measured pressure signal may be determined. By analyzing the frequency content of the pressure signal, a condition such as a degraded compressor or turbine, due to a broken fan blade for example, may be diagnosed. As such, a more specific diagnosis of the turbocharger degradation may be provided.

FIG. 6 shows a method 600 for diagnosing a condition in a turbocharger, such as the turbocharger 200 described above with reference to FIG. 2. Specifically, the method includes measuring pressures using pressure sensors positioned at various locations within the turbocharger, and comparing the measured pressure value(s) to respective threshold pressure(s). For example, a first pressure measured at a first location is compared to a first threshold pressure. Degradation of the turbocharger is determined based on the first pressure falling below the first threshold pressure. As described above, the method is carried out while an engine to which the turbocharger is coupled is in operation, and (possibly) while a vehicle, such as a rail vehicle, in which the turbocharger is positioned is travelling.

At step 602, operating conditions are determined. The operating conditions may include boost pressure, ambient pressure, ambient temperature, engine notch setting, and the like.

At step 604, pressure is measured at a location within the turbocharger. As described above, pressure sensors may be disposed in various locations within the turbocharger, such as at a diffuser in the compressor casing, in a seal cavity, in an oil cavity, or the like. In some examples, the pressure may be determined at a location such as in an intake manifold of the engine. In some examples, pressure may be measured at more than one location. For example, the pressure may be measured in the oil cavity and the seal cavity, or the pressure may be measured in the oil cavity, and/or the seal cavity.

Once the pressure is measured, it is determined if the measured pressure has passed a threshold pressure at step 606. For example, if one or both of the non-contact compressor labyrinth seal and the turbine labyrinth seal are degraded, a pressure in the oil cavity may increase and the pressure may exceed the threshold pressure. As another example, if one or both of the non-contact seals have degraded, a pressure in the seal cavity may decrease and the pressure may fall below the threshold pressure. In some examples, pressure may be measured at multiple locations and compared to respective thresholds. For example, a first pressure may be measured at a first location in the oil cavity and a second pressure may be measured in a second location at the diffuser in the compressor casing. The first pressure is compared to a first threshold pressure corresponding to a threshold pressure for the oil cavity, and the second pressure is compared to a second threshold pressure corresponding to a threshold pressure for the diffuser. If both the first and second pressures are past their respective thresholds, degradation may be indicated. It should be understood that the threshold pressure may vary based on engine operating conditions. For example, the threshold pressure, as well as the measured pressure, may change with engine speed, engine load, ambient temperature, ambient pressure, engine oil temperature, engine coolant temperature, fuel injection advance angle, charge air pressure, turbocharger speed, charge air temperature, and the like.

If it is determined that the measured pressure has not passed the threshold pressure, it is indicated that the turbocharger is not degraded, at step 610. Alternatively, no action may be taken, in certain embodiments. On the other hand, if it is determined that the measured pressure has passed the threshold pressure, it is indicated that the turbocharger is degraded, at step 608. As described above, when degradation is identified, the controller may send a diagnostic code to light a malfunction indicator lamp (MIL) which is displayed via an operator interface panel, send a diagnostic code to a central dispatch control center, or the like.

In this way, a degraded condition of the turbocharger may be diagnosed while the turbocharger is in operation. For example, degradation of the turbocharger due to leaks in one or more non-contact seals such as the compressor and turbine labyrinth seals may be identified when one or more measured pressures within the turbocharger pass respective threshold pressures. When the measured pressure has not passed the threshold pressure, it may be indicated that an engine crankcase over pressure event may be due to a condition other than a degraded turbocharger, such as degraded piston rings or some other source.

In some embodiments, degradation of the turbocharger may be based on a measured pressure difference within the turbocharger, frequency content of one of the pressure signals, and comparison of measured pressure with a threshold pressure. As an example, the frequency content may be determined only if the pressure difference is greater than a threshold difference, and the pressure difference may be determined only if the measured pressure has passed a threshold pressure.

In embodiments, parameters (e.g., pressure threshold values) for assessing turbocharger health or condition are determined empirically as a function of engine/system operating mode. For a given engine/system, pressures in a turbocharger of the system are measured for various operating modes, when the engine/system is known to be working optimally. For example, the engine/system may be a test model, a new model, a recently serviced model, etc. (Locations where the pressures may be measured are as described in the other sections in the present description.) The pressure values are then stored and used for assessing turbocharger health in engine/systems of the same or similar type. In another embodiment, pressure values are measured in several units of the same type of engine/system (known to be working optimally) and averaged or otherwise processed for determining a set of composite values to be used in assessing engine/systems of the same or similar type. In another embodiment, pressure values are measured in an engine/system that has been deployed in the field for normal and ongoing use, but at a time when the engine/system is new and/or otherwise considered to be working optimally. The pressure values are stored and then referenced during ongoing use of the engine/system, for future assessments of turbocharger health. In another version of such an embodiment, initially-sensed pressure values (in a new, deployed engine/system) are only used for future assessment if they fall within an error threshold of test values for the same or similar type of engine/system. Thus, if the initially-sensed values are (relatively) far away from expected values, based on a designated error threshold or otherwise, an alert or alarm is generated for informing an operator that something may be amiss, or a similar remedial action is taken. "Engine/system" means an engine, engine system, vehicle or other system having an engine system, or the like.

Another embodiment relates to a method comprising a step of determining a first pressure at a first location within a turbocharger, and a step of determining a second pressure at a second location within the turbocharger. The method further comprises a step of outputting a control signal, indicative of or responsive to a condition of the turbocharger, based on the first pressure and the second pressure.

In another embodiment of a method, the method comprises determining a first pressure at a first location in a turbocharger, determining a second pressure at a second location in a turbocharger, and determining frequency content of the first second pressure. The method further comprises outputting a control signal, indicative of or responsive to a condition of the turbocharger, based on the first pressure, the second pressure, and the frequency content of the second pressure.

Another embodiment relates to a system including a turbocharger with a compressor and a turbine. The turbocharger is coupled to an engine in a vehicle. The system further includes a first pressure sensor, a second pressure sensor, and a controller. The first pressure sensor is disposed in an oil cavity of the turbocharger and configured to generate a first signal. The second pressure sensor is disposed in a seal cavity of the turbocharger and configured to generate a second signal. The controller is configured to identify a first pressure from the first signal and a second pressure from the second signal, and to determine a state of the turbocharger based on the first and second pressures. For example, the controller may be configured to determine a health state of the turbocharger based on the first and second pressures. As another example, the controller may be configured to determine whether the turbocharger has degraded (e.g., to the point where servicing is required) based on a difference between the first pressure and the second pressure, such as the difference being greater than a designated threshold difference.

Another embodiment relates to a system comprising a control module configured to receive a first pressure signal from a first pressure sensor disposed in a first location of a turbocharger. The control module is further configured to receive a second pressure signal from a second pressure sensor in a second location of the turbocharger. (The first and second locations may be as described elsewhere in the present description.) The control module is further configured to output a control signal based on the first pressure signal and the second pressure signal. For example, the control module may be configured to assess possible degradation of the turbocharger based on the first and second pressure signals, and to output the control signal responsive to determining degradation of the turbocharger. The control signal may be formatted or configured to control a system (e.g., operator interface, alarm) for indicating the degradation, or the control signal may be used to control a vehicle traction system to account for the degradation. The control module may be a hardware and/or software module, meaning it may comprise: interconnected electronic components configured to carry out one or more designated functions (e.g., receive input signals, and generate output/control signals based on the input signals); and/or software, meaning one or more sets of electronically readable instructions, stored in non-transitory media/medium, that when read and executed by an electronic device (group of interconnected electronic components) cause the electronic device to perform one or more functions according to the contents of the instructions.

In another embodiment, the control module is configured to determine a pressure difference based on the first pressure signal and the second pressure signal, and to determine whether the pressure difference meets one or more designated criteria. If the pressure difference meets the one or more designated criteria, the control module is configured to output a control signal indicative of, or relating to, a degraded turbocharger condition. The one or more designated criteria are pre-determined as a function of the locations of where the pressures are measured, and are indicative of a degraded condition of the turbocharger. For example, a healthy turbocharger may normally have a first pressure difference between two points, as a function of operating mode. The one or more criteria comprise deviating from the first pressure difference (either smaller or larger pressure difference) by more than a threshold. As another example, one or more criteria may comprise deviating from the first pressure difference by more than a threshold that reflects only a larger pressure difference, or only a smaller pressure difference. That is, if the pressure difference is normally "X," in one embodiment the criteria are met only if X is exceeded by a threshold, and in another embodiment, the criteria are met only if the sensed pressure difference is lower than X by a threshold. The criteria selected will depend on the particular turbocharger and locations of where pressure is measured.

In another embodiment, the control module is configured to perform a frequency analysis of one or both of the first and second pressure signals, and to output the control signal based (at least in part) on the frequency analysis.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   determining a first pressure at a first location within a turbocharger;
   determining a second pressure at a seal cavity within a turbocharger casing of the turbocharger and in communication with a turbocharger seal; and
   indicating degradation of the turbocharger seal based on the first pressure and the second pressure.

2. The method of claim 1, wherein the first location is in an oil cavity of the turbocharger or at a diffuser in a compressor casing of the turbocharger.

3. The method of claim 1, further comprising indicating degradation of a non-contact seal of the turbocharger if the first pressure has passed a first threshold pressure or the second pressure has passed a second threshold pressure.

4. The method of claim 1, further comprising indicating degradation of a non-contact seal of the turbocharger when a difference between the first pressure and the second pressure is greater than a threshold difference.

5. The method of claim 1, further comprising determining frequency content of the second pressure, and based on the frequency content, indicating degradation of a compressor of the turbocharger.

6. The method of claim 1, further comprising indicating degradation of the turbocharger while the turbocharger is in operation coupled to an engine in a vehicle.

7. A method, comprising:
   determining a first pressure at a first location in a turbocharger;
   determining a second pressure at a seal cavity within a turbocharger casing in a turbocharger and in communication with a seal;
   determining frequency content of the second pressure; and
   diagnosing a condition of the turbocharger based on the first pressure and the second pressure and the frequency content of the second pressure.

8. The method of claim 7, wherein the first location is in an oil cavity of the turbocharger or at a diffuser in a compressor casing of the turbocharger.

9. The method of claim 7, further comprising diagnosing a condition of the turbocharger if the first pressure has passed a first threshold pressure or the second pressure has passed a second threshold pressure.

10. The method of claim 7, further comprising diagnosing degradation of a non-contact seal of the turbocharger when a difference between the first pressure and the second pressure is greater than a threshold difference.

11. The method of claim 10, further comprising diagnosing the condition of the turbocharger while an engine to which the turbocharger is coupled is in operation, and wherein the difference between the first pressure and the second pressure varies with one or more engine operating parameters.

12. The method of claim 7, wherein the second location is a seal cavity of the turbocharger, and the method further comprises diagnosing degradation of a compressor of the turbocharger based on the frequency content of the second pressure.

13. A system, comprising:
a control module configured to receive a first pressure signal from a first pressure sensor disposed in a first location of a turbocharger and to receive a second pressure signal from a second pressure sensor in a seal cavity within a turbocharger casing of the turbocharger and in communication with a seal;
wherein the control module is further configured to output a control signal based on the first pressure signal and the second pressure signal.

14. A system, comprising:
a turbocharger with a compressor and a turbine, the turbocharger coupled to an engine in a vehicle;
a first pressure sensor configured to generate a first signal, the first pressure sensor disposed in an oil cavity of the turbocharger;
a second pressure sensor configured to generate a second signal, the second pressure sensor disposed in a seal cavity within a turbocharger casing of the turbocharger and in communication with a seal; and
a controller configured to identify a first pressure from the first signal and a second pressure from the second signal and to identify degradation of the turbocharger if a difference between the first pressure and the second pressure is greater than a first threshold difference.

15. The system of claim 14, wherein the first threshold difference varies with an operating condition of the engine.

16. The system of claim 14, further comprising a third pressure sensor configured to generate a third signal, the third pressure sensor disposed in a compressor casing at a diffuser of the turbocharger or in an intake manifold of the engine.

17. The system of claim 16, wherein the controller is further configured to identify degradation of the turbocharger when a difference between the second pressure and the third pressure is greater than a second threshold difference, the second threshold difference varying with an operating condition of the engine.

18. The system of claim 14, wherein the controller is further configured to identify degradation of the turbocharger when the first pressure passes a first threshold pressure and the second pressure passes a second threshold pressure.

19. The system of claim 14, wherein the controller is further configured to identify frequency content of the second signal and to identify degradation of the compressor based on the frequency content.

20. The system of claim 14, wherein the turbocharger further includes an orifice in the seal cavity of the turbocharger, the orifice configured to generate a choked air flow.

21. The system of claim 14, wherein the controller is further configured to identify degradation of a non-contact seal when the difference between the first pressure and the second pressure is greater than the first threshold difference.

* * * * *